(12) United States Patent
Bolbenes et al.

(10) Patent No.: US 11,900,121 B2
(45) Date of Patent: Feb. 13, 2024

(54) METHODS AND APPARATUS FOR PREDICTING INSTRUCTIONS FOR EXECUTION

(71) Applicant: Arm Limited, Cambridge (GB)

(72) Inventors: Guillaume Bolbenes, Vallauris (FR); Florent Begon, Antibes (FR); Thibaut Elie Lanois, Peymeinade (FR); Houdhaifa Bouzguarrou, Valbonne (FR)

(73) Assignee: Arm Limited, Cambridge (GB)

( * ) Notice: Subject to any disclaimer, the term of this patent is extended or adjusted under 35 U.S.C. 154(b) by 73 days.

(21) Appl. No.: 17/501,257

(22) Filed: Oct. 14, 2021

(65) Prior Publication Data
US 2023/0118268 A1 Apr. 20, 2023

(51) Int. Cl.
*G06F 9/38* (2018.01)
*G06F 9/30* (2018.01)

(52) U.S. Cl.
CPC ........ *G06F 9/3844* (2013.01); *G06F 9/30047* (2013.01); *G06F 9/3802* (2013.01); *G06F 9/3861* (2013.01)

(58) Field of Classification Search
None
See application file for complete search history.

(56) References Cited

U.S. PATENT DOCUMENTS

| | | | | |
|---|---|---|---|---|
| 6,425,076 B1* | 7/2002 | Killian | ................. | G06F 9/3848 712/240 |
| 2019/0317769 A1* | 10/2019 | Hu | ......................... | G06F 9/3848 |
| 2020/0257534 A1* | 8/2020 | Bonanno | ............... | G06F 9/3806 |

* cited by examiner

*Primary Examiner* — John M Lindlof
(74) *Attorney, Agent, or Firm* — NIXON & VANDERHYE P.C.

(57) ABSTRACT

Aspects of the present disclosure relate to an apparatus comprising prediction circuitry having a plurality of hierarchical prediction units to perform respective hierarchical predictions of instructions for execution, wherein predictions higher in the hierarchy have a higher expected accuracy than predictions lower in the hierarchy. Responsive to a given prediction higher in the hierarchy being different to a corresponding prediction lower in the hierarchy, the corresponding prediction lower in the hierarchy is corrected. A prediction correction metric determination unit determines a prediction correction metric indicative of an incidence of uncorrected predictions performed by the prediction circuitry. Fetch circuitry fetches instructions predicted by at least one of said plurality of hierarchical predictions, and delays said fetching based on the prediction correction metric indicating an incidence of uncorrected predictions below a threshold.

19 Claims, 7 Drawing Sheets

PRED: P0

CYCLE: 0   A

1   A+1

2   A+2   ←------- A+2 HAS A
                   BRANCH WITH
3   B              B AS TARGET

| PRED: | P0 | P1 | P2 |
|---|---|---|---|
| CYCLE: 0 | A | | |
| 1 | A+1 | A | |
| 2 | A+2 | A+1 | A |
| 3 | A+3 | A+2 | A+1 |
| 4 | A+4 | A+3 | A+2 [TARGETS B] |
| 5 | B | | |
| 6 | B+1 | B | |
| 7 | B+2 | B+1 | B |
| 8 | B+3 | B+2 | B+1 |
| | [TARGETS C] | | |
| 9 | C | | B+2 |
| 10 | C+1 | C | |

FIG. 3B

| CYCLE: | 0 | 1 | 2 | 3 | 4 |
|---|---|---|---|---|---|
| PRED: | P0 | P1 | P2 | P3 | |
| FETCH: | | F0 | F1 | F2 | DEC |

FIG. 4A

| CYCLE: | 0 | 1 | 2 | 3 | 4 | 5 | 6 |
|---|---|---|---|---|---|---|---|
| PRED: | P0 | P1 | P2 | P3 | | | |
| FETCH (DELAY 1) | | | F0 | F1 | F2 | DEC | |
| FETCH (DELAY 2) | | | | F0 | F1 | F2 | DEC |

FIG. 4B

| FETCH: | P0 | P1 | P2 |
|---|---|---|---|
| CYCLE: 2 | A | | |
| 3 | A+1 | A | |
| 4 | A+2 | A+1 | A |
| 5 | | A+2 | A+1 |
| 6 | | | A+2 |
| 7 | B | | |
| 8 | B+1 | B | |
| 9 | B+2 | B+1 | B |
| 10 | | B+2 | B+1 |
| 10 | C | | B+2 |

METHODS AND APPARATUS FOR PREDICTING INSTRUCTIONS FOR EXECUTION

BACKGROUND

The present technique relates to the prediction of instructions that will be executed by a processing apparatus. For example, a branch predictor may attempt to predict which way a branch will go before its outcome is actually determined. This allows instructions to be fetched before it is finally determined that they are required, which improves the flow of instructions through a processing pipeline and significantly improves performance.

However, the prediction process can be relatively computationally expensive, consuming processing resources and power. There is therefore a desire for prompt instruction fetching, whilst not sacrificing prediction power.

SUMMARY

At least some examples provide an apparatus comprising:
prediction circuitry to predict instructions for execution, wherein said prediction circuitry comprises:
  a plurality of hierarchical prediction units, comprising a lowest level prediction unit and one or more higher level prediction units to:
    perform respective hierarchical predictions of each of the instructions for execution, wherein predictions higher in the hierarchy have a higher expected accuracy than predictions lower in the hierarchy; and
    responsive to a given prediction higher in the hierarchy being different to a corresponding prediction lower in the hierarchy, correct the corresponding prediction lower in the hierarchy, and
  a prediction correction metric determination unit to determine a prediction correction metric indicative of an incidence of uncorrected predictions performed by the prediction circuitry, and
fetch circuitry to fetch instructions for execution, the fetch circuitry being configured to:
  fetch instructions predicted by at least one of said plurality of hierarchical predictions; and
  delay said fetching based on the prediction correction metric indicating an incidence of uncorrected predictions below a threshold.
Further examples provide a method comprising:
predicting instructions for execution using prediction circuitry comprising a plurality of hierarchical prediction units, comprising a lowest level prediction unit and one or more higher level prediction units to, wherein said predicting comprises:
  performing respective hierarchical predictions of each of the instructions for execution, wherein predictions higher in the hierarchy have a higher expected accuracy than predictions lower in the hierarchy; and
  responsive to a given prediction higher in the hierarchy being different to a corresponding prediction lower in the hierarchy, correcting the corresponding prediction lower in the hierarchy,
determining a prediction correction metric indicative of an incidence of uncorrected predictions performed by the prediction circuitry; and
fetching instructions for execution, the fetching comprising:
  fetching instructions predicted by at least one of said plurality of hierarchical predictions; and
  delaying said fetching based on the prediction correction metric indicating an incidence of uncorrected predictions below a threshold.

Further aspects, features and advantages of the present technique will be apparent from the following description of examples, which is to be read in conjunction with the accompanying drawings.

DESCRIPTION OF EXAMPLES

In an example, an apparatus comprises prediction circuitry to predict instructions for execution, and fetch circuitry to fetch instructions for execution. These circuitry elements may be dedicated circuitry, or conceptual units executed by general-purpose circuitry such as a processor. They may form part of a processing pipeline, for example also including decode circuitry to decode fetched instructions and execution circuitry for executing decoded instructions.

The prediction circuitry comprises a plurality of hierarchical prediction units. Within the hierarchy is a lowest level prediction unit and one or more higher level prediction units. Each of the hierarchy of prediction units performs respective hierarchical predictions of each of the instructions for execution. Predictions higher in the hierarchy have a higher expected accuracy than predictions lower in the hierarchy. They may also take more time to perform each prediction. For example, the lowest level unit may take a single processing cycle to perform and output a prediction, whilst the second level takes two processing cycles, the third level takes three processing cycles, and so on.

More generally, the lowest level prediction unit may be configured to output a given lowest level prediction in a first processing cycle, whilst each of the one or more higher level prediction units is configured to output respective predictions, corresponding to the given lowest level prediction, in respective processing cycles immediately subsequent to said first processing cycle corresponding to their respective hierarchy levels. The fetch circuitry may be configured to, by default, begin fetching a given instruction, corresponding to said first prediction, in said first processing cycle. This provides an effective way for fetching to begin following the lowest-level prediction, after which the higher level predictions proceed (for example in parallel with a fetch pipeline).

Responsive to a given prediction higher in the hierarchy being different to a corresponding prediction lower in the hierarchy, the corresponding prediction (or predictions) lower in the hierarchy is corrected. For example, the lowest level unit may make a prediction in respect of a given instruction, after which the first level makes a different prediction in respect of the same instruction. The lowest level prediction of the given instruction is then corrected based on the first level prediction. Similarly, a lowest level ors first level prediction may be corrected by a second level prediction. This allows a lower level prediction to take advantage of the more accurate (but more time consuming) higher level prediction units.

The prediction circuitry further comprises a prediction correction metric determination unit to determine a prediction correction metric indicative of an incidence of uncorrected predictions performed by the prediction circuitry. An uncorrected prediction can be assumed to be an accurate prediction.

As noted above, the apparatus comprises fetch circuitry. The fetch circuitry is configured to fetch instructions predicted by at least one of said plurality of hierarchical predictions. For example, the fetch circuitry may begin fetching an instruction immediately upon its prediction by the lowest level prediction unit (whilst the higher level prediction units are still predicting). This allows a rapid (albeit less accurate) fetching of a predicted instruction. In such examples, the aforementioned correction of a lower level prediction may be performed directly within the fetch circuitry (e.g. on a fetch pipeline implemented by the fetch circuitry).

The fetch circuitry is further configured to delay a given fetching operation based on the prediction correction metric indicating an incidence of uncorrected predictions below a threshold.

The delay of fetching gives a lower-confidence and potentially inaccurate prediction a chance to be corrected by a higher level prediction, before the fetch is performed. This reduces the chance that an instruction will be incorrectly fetched, at the expense of delaying the fetching of an instruction. However, the inventors have observed that such a delay, when dynamically managed via the prediction correction metric as described herein, does not significantly compromise overall instruction throughput. This is, in part, because at times of more accurate prediction, instructions can still be promptly (e.g. immediately) fetched. The resources and power associated with fetching erroneously-predicted instructions are thus reduced, without significantly compromising overall performance.

The prediction correction metric may be determined as a single metric, or as multiple prediction-unit-specific metrics. If multiple metrics are implemented, the aforementioned delay may be specifically performed in respect of predictions by prediction units with correction metrics below a threshold.

The above-described prediction correction metric determination unit may determine the prediction correction metric in various ways. In one example the prediction correction metric is determined as a rate of performing the aforementioned corrections, such that a higher correction rate corresponds to a lower prediction correction metric.

In another example, the prediction correction metric is determined as a number of corrections performed within a time window. The window may be determined as a number of clock cycles, or a number of lowest-level predictions. A higher number of predictions within a given window may be taken to indicate a lower prediction correction metric. This provides an effective, and computationally efficient, measure of prediction performance, as a large number of corrections implies that the predictions are not accurate.

In this example, a weight may be applied to each correction in the determination of the prediction correction metric, such that corrections from higher level prediction units have more weight than corrections from lower level prediction units. This takes into account that higher level prediction units are more likely to make a correct prediction, and so a correction from a higher level is more likely to be a genuinely correct correction.

In an example, the prediction correction metric determination unit is configured to determine the prediction correction metric at the expiry of each of a plurality of prediction windows. These may be the same as, or different to, the aforementioned time windows. The fetch circuitry in this example is configured to perform said delay based on the determined prediction correction metric of a previous one of said plurality of windows (e.g. a most recently expired window). Thus, the incidence of uncorrected predictions is tracked over the course of a time window, and then the overall metric for that window is used to determine whether to delay fetch operations in a subsequent window (e.g. the next window). This allows account to be taken of changing incidence of uncorrected predictions, whilst not incurring the processing cost that would be associated with a constant running determination of average correction rate.

In an example, each of the one or more higher level prediction units is responsive to a given prediction matching a corresponding prediction lower in the hierarchy to confirm said corresponding prediction lower in the hierarchy. This provides a converse to the above-described correction: where a lower-level prediction is "correct" to the extent that it matches a higher-level prediction, it can be confirmed by that higher-level prediction. The confirmation may be implicit, based on a lack of correction as opposed to an explicit confirmation indication. In this example, the number of confirmations in a given time window (or the rate of confirmations) may be taken as a prediction correction metric.

In an example, the prediction circuitry and fetch circuitry are configured to operate based on processing cycles. The fetch circuitry may accordingly be configured to delay said fetching by an integer number of processing cycles, for example a single processing cycle or two processing cycles. Where prediction units take a small number of processing cycles (e.g. a single cycle for the lowest level prediction, and two cycles for the next level etc., as described above), such a delay can allow an additional one or more predictions to be performed, to potentially correct (or confirm) the lowest level prediction. Such a delay can thus be relatively short (e.g. a single cycle), thereby not significantly impacting throughput whilst still providing a significantly reduced number of incorrectly-fetched instructions.

In examples, the fetch circuitry may vary the delay amount. For example, it may delay said fetching by a first amount based on the prediction correction metric indicating an incidence of uncorrected predictions below a first threshold, and by a second amount based on the prediction correction metric being below a second threshold. For example, the second threshold may indicate a lower incidence of uncorrected predictions than the first, whilst the second amount is larger than the first amount. In other words, the fetching may be delayed more if the correction metric indicates a lower incidence of uncorrected predictions. This allows for a higher level (and thus higher accuracy) prediction to potentially correct the prediction in question, compared with a shorter delay. The apparatus can thus adaptively account for a changing incidence of uncorrected predictions.

For example, the first amount may be a single processing cycle whilst the second amount is two processing cycles. Alternatively or additionally, the first threshold may correspond to a 50% rate of uncorrected predictions, whilst the second threshold corresponds to a 25% rate of uncorrected predictions.

In an example, the fetch circuitry is responsive to a given correction, performed by a higher level prediction unit having a hierarchy level equal to or greater than a prediction threshold, to bypass said delaying when fetching an associated instruction. Thus, for predictions which are known to be relatively accurate (because, whilst not initially accurate, they have been corrected by a more accurate prediction), it can effectively be assumed that they will be accurate and the instruction fetched without delay. This maximises throughput of instructions, whilst not incurring significant risk that substantial resources will be wasted on incorrect predictions (because the bypassing of the delay is only performed when the predictions are likely to be accurate). The threshold can be selected as a trade-off between likely prediction performance (which increases with prediction level) and potential throughput increase (which decreases with prediction level, because fewer corrections will trigger the bypass). The threshold may for example be the highest hierarchy level.

In an example, a given higher level prediction may be different to a corresponding lower level prediction (which can be interpreted as the lower level prediction being incorrect, which may trigger a correction as described above). In this example, the prediction circuitry may be configured to flush one or more predictions subsequent to the corresponding first prediction. This is because the subsequent predictions can be assumed to be incorrect, for example because they are based on extrapolations from the incorrect prediction. The later predictions can thus be considered useless, and hence flushed.

In this example, the fetch circuitry may be configured to flush any fetched instructions corresponding to flushed predictions. This improves efficiency by preventing resources being spent fetching instructions corresponding to flushed (i.e. deemed inaccurate) predictions.

In an example, the fetch circuitry can receive a flush command. This may for example be received from processing circuitry such as a processor core (for example in response to an incorrectly-predicted fetch instruction which was not caught by the aforementioned prediction correction techniques because no prediction unit predicted it correctly). In response to such a flush command, the fetch circuitry flushes pending predictions and/or pending instructions (for example predictions within a fetch pipeline). For example, the flush may be applied to every pending prediction, every pending fetched instruction and instruction currently in the core which are younger than the flush command. As above, these pending predictions may be considered useless (as they are based on an extrapolations subsequent to an incorrect prediction) and therefore fetching them is a waste of resources. Additionally, the correction metric could be reset responsive to a flush command, and a new time window started.

In this example, the fetch circuitry may bypass the above-described delaying until a post-flush time window, which may for example be a given number of processor cycles (for example 4 cycles). The prediction correction metric may also be reset. This allows a new prediction flow to begin, with the bypassing allowing fetching to promptly begin based on the new predictions (for example to refill a fetch pipeline).

Examples of the present disclosure will now be described with reference to the drawings.

Figure 1:
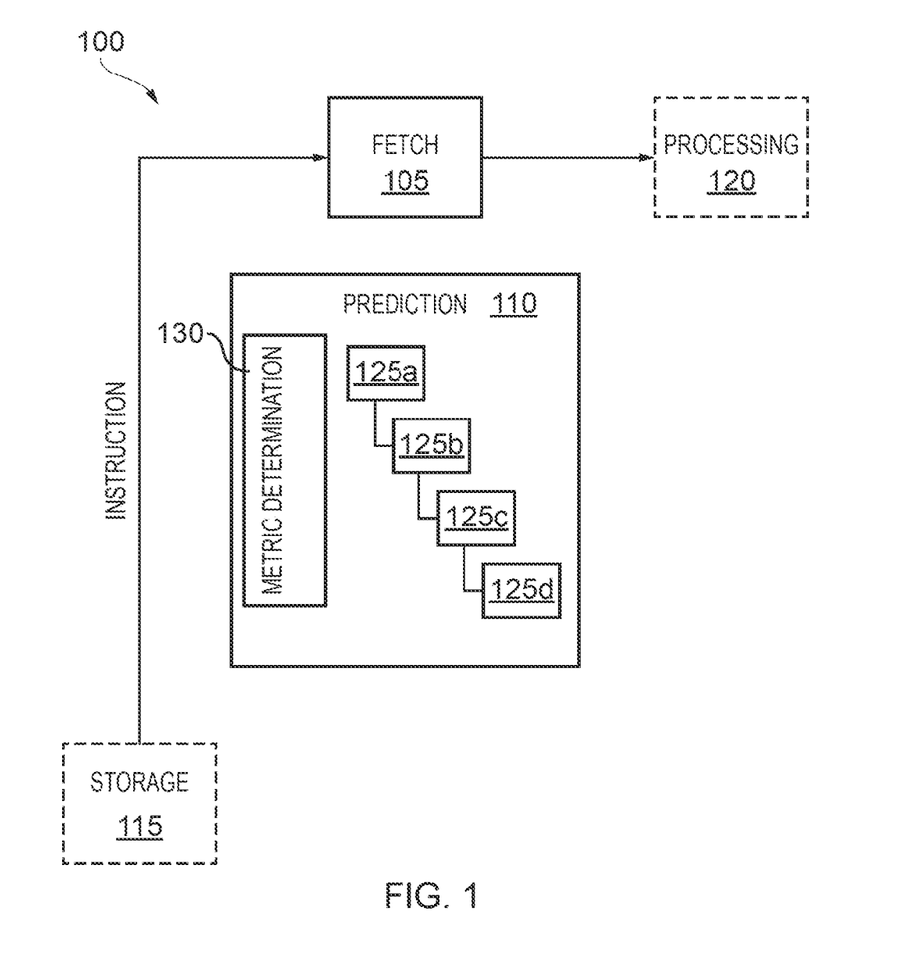
FIG. 1 schematically depicts an apparatus according to an example.

FIG. 1 schematically shows an apparatus 100 according to an example of the present disclosure. The apparatus comprises fetch circuitry 105 and prediction circuitry 110. These may be dedicated circuitry units, or conceptual functional blocks implemented by general-purpose circuitry such as a central processing unit or graphics processing unit.

The fetch circuitry 105 is configured to fetch program instructions from a storage 115, which may for example be a memory or cache. The fetch circuitry 105 is further configured to provide fetched instructions to processing circuitry 120 for execution. The processing circuitry 120 may comprise multiple pipeline stages such as a decode unit to decode instructions, an issue unit to issue decoded instructions, and an execution unit to receive issued decoded instructions and execute them. Alternatively, the processing circuitry 120 may comprise other elements for the purpose of processing and executing fetched instructions. For brevity, these elements are not shown in FIG. 1.

Fetching instructions from the storage 115 takes an amount of time, and thus could represent a bottleneck for the throughput of instructions. The prediction circuitry 110 mitigates this bottleneck by predicting which instructions will soon be required for execution, and informing the fetch circuitry 105 of these predictions so that the predicted instructions can be fetched in advance of when they are required by the processing circuitry 120.

To this end, the prediction circuitry 110 comprises multiple hierarchical prediction units 125a-125d. Each of these prediction units predicts instructions which will be required for execution, for example by tracking a pattern of fetched instructions and extrapolating that pattern into the future. Units higher in the hierarchy generate more accurate predictions, but take a longer time to generate those predictions. The prediction circuitry also comprises a correction metric determination unit to track the ongoing incidence of uncorrected predictions by the prediction units 125a-125d. A high incidence of uncorrected predictions can be seen as an indication of a high prediction accuracy.

Figure 2:
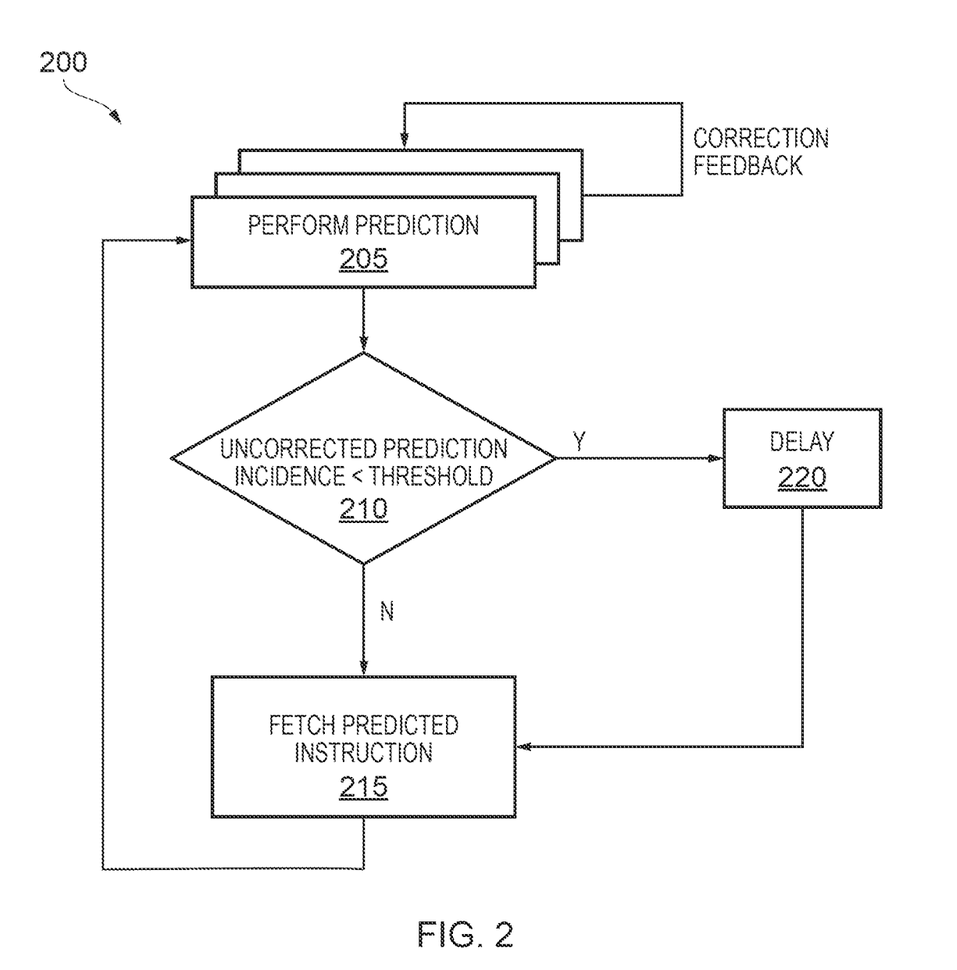
FIG. 2 shows a method according to an example.

FIG. 2 depicts a method 200 which may be employed by the apparatus 100. At block 205, predictions are performed by the hierarchical prediction units 125a-125 (multiple parallel blocks are shown, to represent the prediction units running in parallel). If a higher-level prediction unit contradicts a lower-level prediction, the higher-level prediction can be fed back to correct the lower-level prediction.

Following a prediction, it is determined at block 210 whether the current incidence of uncorrected predictions (as tracked by the correction metric determination unit 130) is below a threshold. If not, meaning that accuracy is relatively high, flow proceeds to block 215 where the predicted instruction is fetched. Alternatively, if the incidence is below the threshold, flow proceeds to block 220 where a delay is applied before the instruction is fetched at block 215.

Flow then returns to block 205.

It will be appreciated that whilst FIG. 2 is shown as a linear series of steps for clarity, in a practical implementation the steps may be performed in parallel, with prediction and fetching being a continuous, parallel, pipelined process.

An example of the above-described prediction will now be described with reference to FIGS. 3A and 3B. For ease of explanation, these examples are expressed in terms of predictions of single instructions. However, in examples, the prediction units may predict blocks of instructions. For example, a prediction unit may predict 8 instructions per cycle, or may perform multiple predictions per cycle with each prediction simultaneously predicting 8 instructions. In such examples, the description below of a branch instruction can be taken as referring to a branch within such a block of instructions.

Figure 3A:
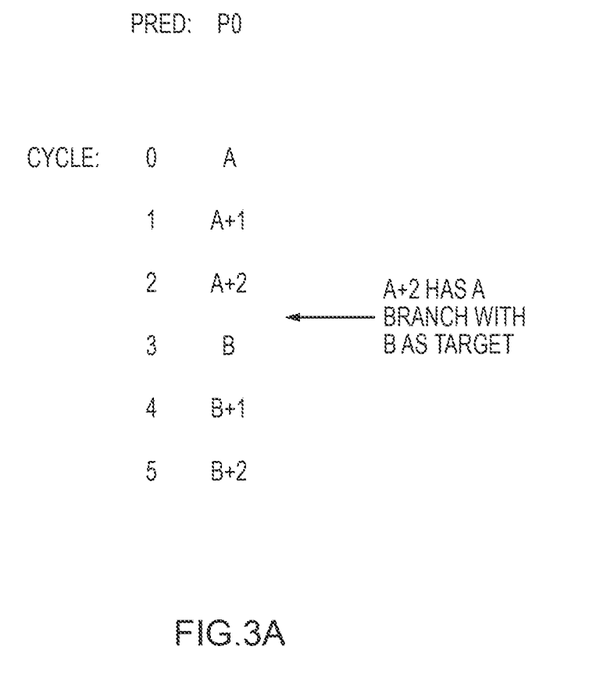
FIGS. 3A and 3B illustrate prediction by hierarchical prediction units.

FIG. 3A shows a simplified example with a single prediction unit P0, which has perfect prediction accuracy. The diagram shows predictions made in consecutive processor cycles 0 to 5.

At cycle 0, P0 predicts instruction A. Based on this, P0 predicts subsequent instructions A+1 and A+2.

Instruction A+2 is a branch instruction, with instruction B as the branch target. P0 correctly predicts this branch, and so instruction B is predicted in cycle 3. Subsequent instructions B+1 and B+2 are then predicted in the next two cycles.

Figure 3B:
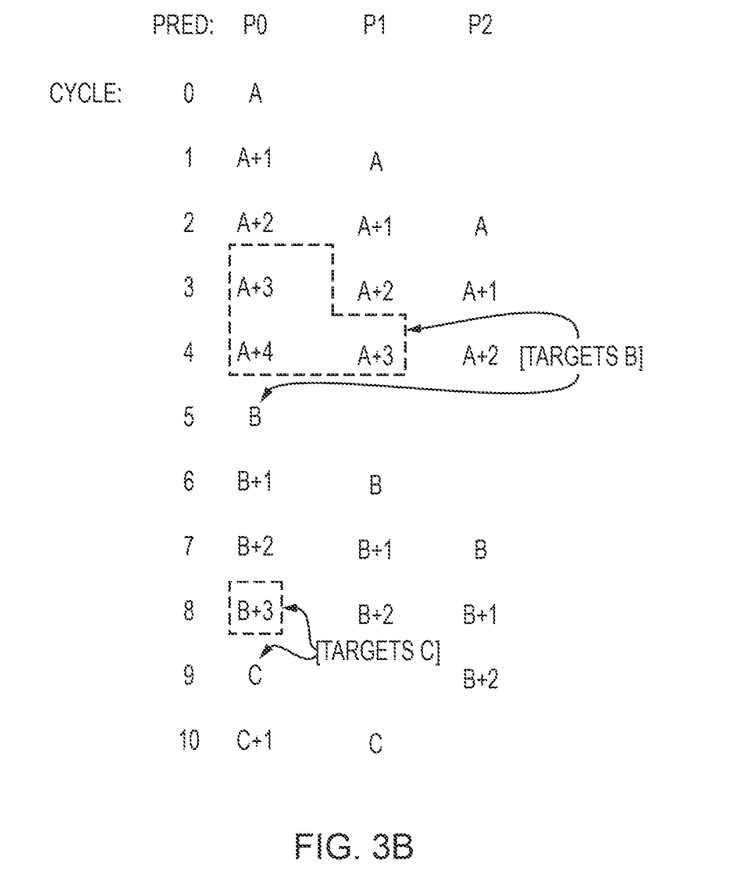

FIG. 3B shows a fuller example, with three hierarchical prediction units P0, P1 and P2 which do not exhibit perfect accuracy. Instead, each has increasing accuracy. P0 takes a single cycle to make a prediction, P1 takes two cycles and P2 takes three cycles. A higher-level prediction unit can correct the prediction of a lower-level unit.

In the same way as for FIG. 3A, at cycle 0, P0 predicts instruction A.

In cycle 1, P0 predicts subsequent instruction A+1, and P1 (having taken an extra cycle to make its prediction) predicts instruction A.

Similarly, in cycle 2, P0 predicts instruction A+2, P1 predicts instruction A+1, and P2 (having taken three cycles to make its prediction) predicts instruction A+2.

In the present example, A+2 is still a branch with B as target. However, P0 (incorrectly) does not predict this, and instead extrapolates from A+2 to predict A+3 in cycle 3.

Simultaneously, P1 predicts A+2 and P2 predicts A+1.

In cycle 4, P0 continues to (incorrectly) extrapolate and predicts A+4. P1 also does not predict the branch, and incorrectly predicts A+3.

However, in cycle 4, P2 predicts A+2 and correctly identifies it as a branch with target B. This information is fed back to lower-level predictors P0 and P1, which flush their incorrect predictions of A+3 and A+4.

In cycle 5, P0 then uses its corrected information and correctly "predicts" B.

In the same way as with the A chain of instructions, B+1 and B+2 are then predicted by P0 in cycles 6 and 7, with P1 and P2 following in the same manner.

In this example, B+2 is actually a branch, with C as target. P0 does not correctly predict this, and instead incorrectly predicts B+3 in cycle 8.

P1 does, however, correctly identify the branch in cycle 8, and feeds this back to P0. P0 then flushes the incorrect prediction of B+3, and "predicts" C in cycle 9. P2 continues to predict the B chain and predicts B+2 in cycle 9, because the above-described correction is only applied to lower-level predictions. This allows P2 to potentially correct an incorrectly "corrected" prediction from P1.

The fetch process is not shown in FIG. 3B. However, if it begins immediately following a given prediction (because no delay is applied per block 220 of FIG. 2, either because prediction accuracy is generally high, or because the method of FIG. 2 is not implemented), it can be seen that any resources spent fetching A+3, A+4 and B+3 are wasted. This is because those instructions were incorrectly predicted.

The "delay" at block 220 of FIG. 2 will now be described with reference to FIGS. 4A and 4B.

Figure 4A:
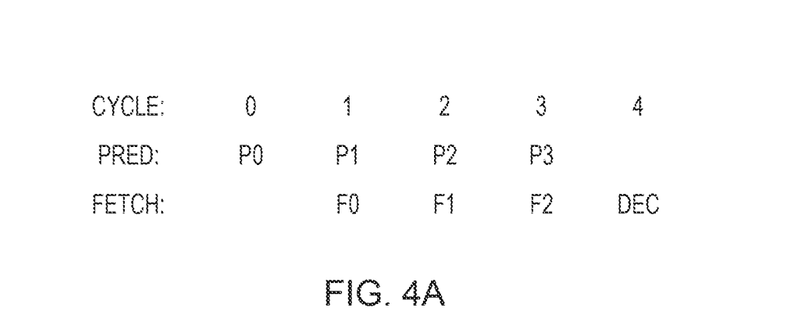
FIGS. 4A and 4B illustrate delays that can be applied to a fetch process.

FIG. 4A illustrates operation with no delay, i.e. if the incidence of uncorrected predictions is above the threshold, indicating a high overall prediction accuracy. The figure shows the prediction and fetching operations, over a series of processor cycles, in respect of a given instruction.

The prediction operations are performed by the above-described hierarchical predictors P0 to P4. The fetch operation comprises a series of pipelined fetch stages F0, F1, F2, followed by a decode stage DEC. The fetch stages begin in the cycle immediately following a prediction by P0, and proceed in consecutive processor cycles.

Figure 4B:
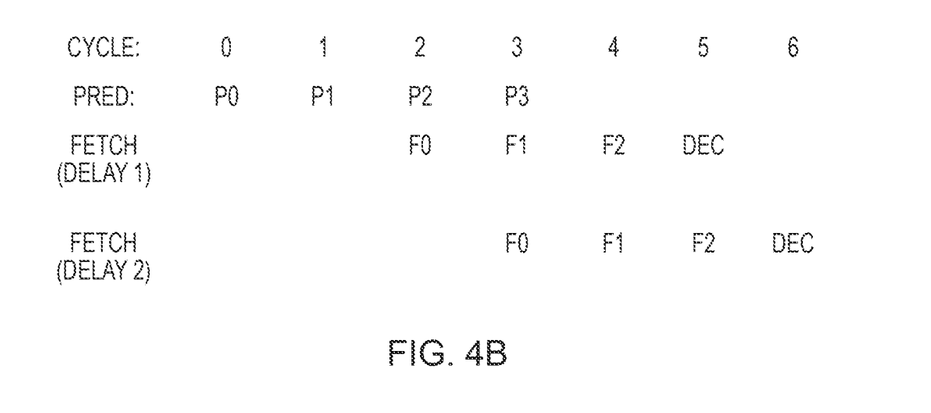

FIG. 4B illustrates operation with two potential delays: a delay of one cycle DELAY1, and a delay of two cycles DELAY2. It can be seen that for DELAY1, each fetch stage is performed one cycle later than the equivalent stage in FIG. 4A. Similarly, for DELAY2, each fetch stage is performed one cycle later than the equivalent stage in DELAY1. As will be seen from the following explanation, the implementation of such a delay can reduce the number of wasted fetch operations, with this effect being stronger for a longer delay (at the expense of an increase in latency).

Figure 5:
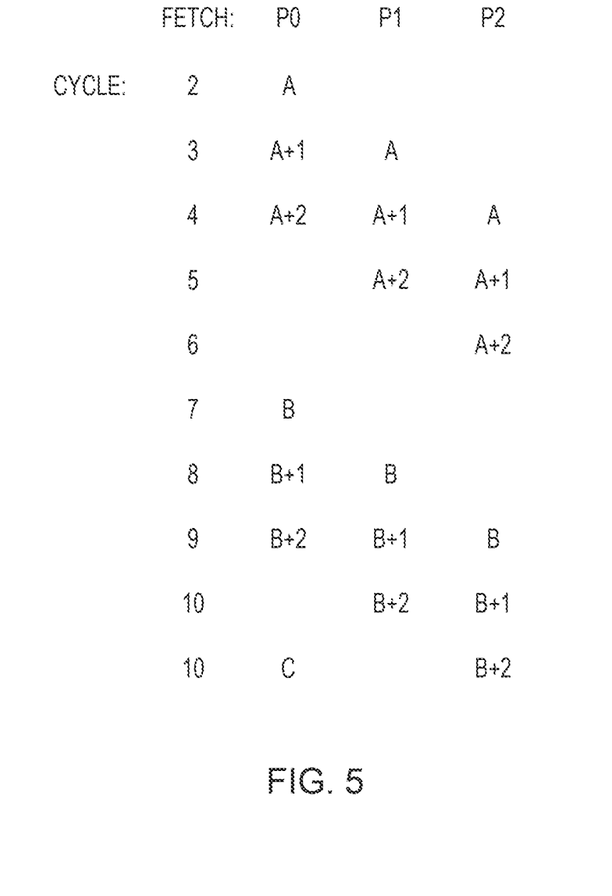
FIG. 5 illustrates fetching by a fetch pipeline.
Figure 6:
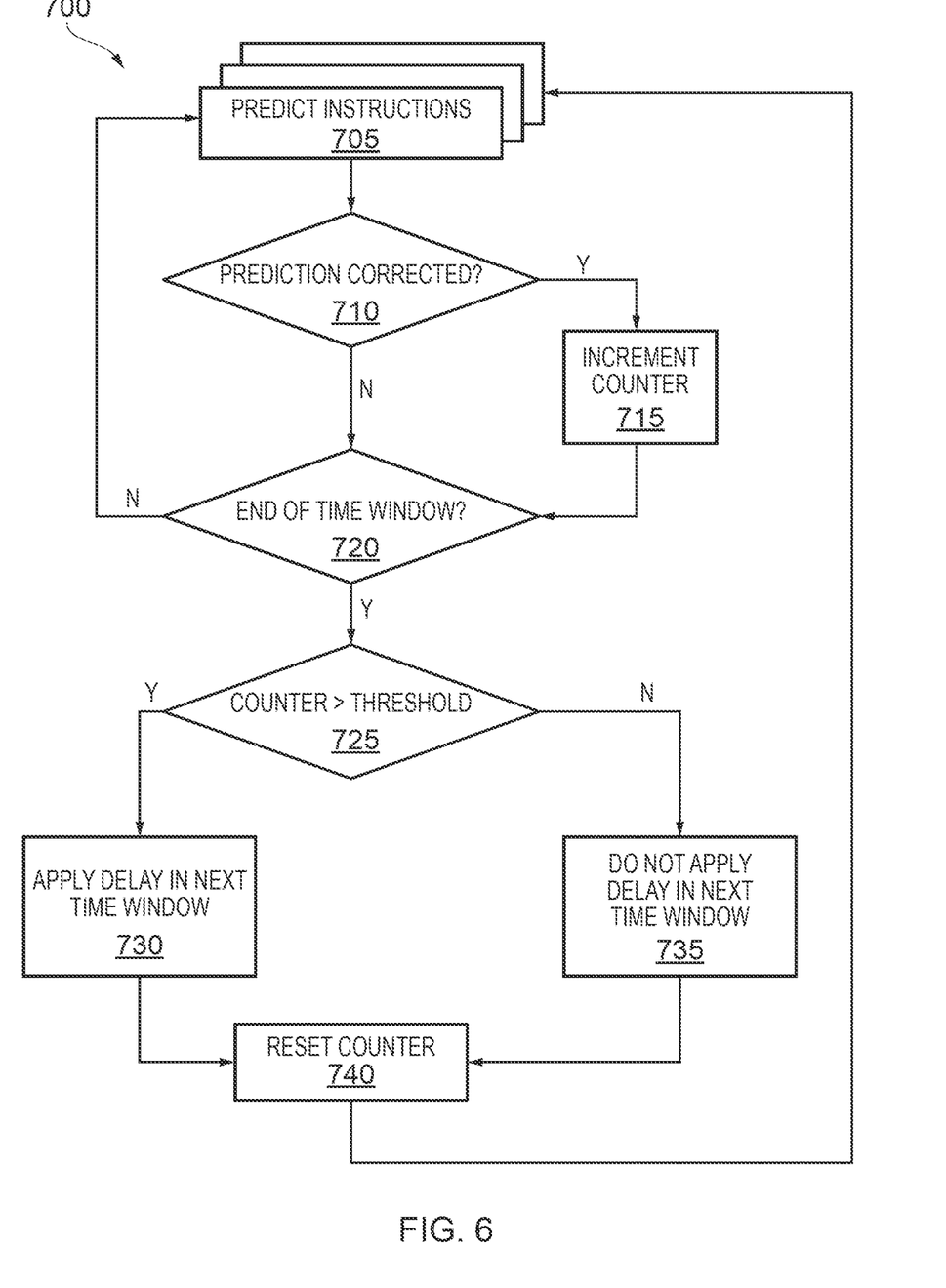
FIG. 6 illustrates a method according to an example.

FIG. 5 illustrates the operation of fetch stages F0 to F2, following the predictions shown in FIG. 3B. The figure is laid out in the same way as FIG. 3B, showing the parallel operation of the fetch stages across a number of processor cycles.

FIG. 5 illustrates the DELAY1 case of FIG. 4B, in which the first fetch stage F0 operates two cycles later than the corresponding first prediction by P0. FIG. 5 thus begins at cycle 2, in which instruction A (predicted in cycle 0 by P0, in FIG. 3B) is handled by F0.

The subsequent fetch operations of FIG. 5 thus initially follow the same pattern as the predictions of FIG. 3B, with a two-cycle lag: in cycle 3, A+1 is handled by F0 and A is handled by F1. Similarly, in cycle 4, A+2, A+1 and A are handled by F0, F1 and F2, respectively.

However, the pattern diverges at cycle 5. It can be seen from FIG. 3B that in cycle the A+2 branch has been identified, and predictions A+3 and A+4 have been flushed. Because of this flushing, the fetch circuitry does not see these predictions as awaiting fetch, and so they are not fetched. F0 is thus idle in cycle 5, rather than fetching A+3. If the above-described DELAY1 had not been implemented, the corresponding line of FIG. 5 would have instead occurred in cycle 4, before the erroneous prediction was corrected. F0 would thus have wasted resources by processing the unneeded instruction A+3.

Similarly, F0 and F1 are idle in cycle 6. In the meantime, A+1 and A+2 complete their path through the prediction pipeline.

The B chain of instructions is then fetched in the same manner, beginning with F0 handling B in cycle 7 (two cycles after its "prediction", by P0, in cycle 5). In this example, instruction B could have been handled by F0 in cycle 5. However, B+1 would still not be handled by F) until cycle 8, as depicted.

It can be seen from FIG. 5 that the implementation of the delay means that despite the erroneous prediction of A+3, no resources are wasted fetching A+3. This comes at the expensive of the lag in throughput, such that each correctly-fetched instruction is fetched one cycle later.

From the present example it can be seen that a delay of a single cycle (i.e. DELAY1) is sufficient to account for corrections by P2. DELAY2 thus offers no additional advantage in this situation. However, in other implementations with higher numbers of prediction units, DELAY2 (or larger delays) can be used to account for corrections by higher-level prediction units than P2.

It can further be seen from FIG. 5 that a "hole" in the fetch pipeline (e.g. cycles 5, 6 and 10 for F0) is indicative of a correction by a higher-level prediction unit. These holes can be counted, and this count used as the above-described prediction correction metric, as a larger number of holes indicates a lower incidence of uncorrected predictions. Furthermore, this hole-counting implicitly gives a higher weight to corrections from a higher level: the correction by P2 that A+2 is a branch with target B causes a two-cycle hole, whereas the correction by P1 that B+2 is a branch with target C causes a one-cycle hole. This means that the metric gives higher weight to corrections which risk more significant amounts of wasted resources, which improves the ability of the method to appropriately induce the delay.

FIG. 7 illustrates a method 700 according to an example of the present disclosure. The method 700 may be implemented by the apparatus of FIG. 1. In this example, the incidence of uncorrected predictions is tracked over a time window, and then this is used to inform whether to apply a fetch delay in a subsequent window.

At block 705, prediction units operate in parallel to predict instructions.

At block 710, it is determined whether a given prediction has been predicted. If so, a counter is incremented at block 715.

Either way, flow proceeds to block 720, where it is determined whether the end of a time window has been reached. If not, flow returns to block 705.

If the end of the time window has been reached, flow proceeds to block 725, where it is determined whether the counter is higher than a threshold. If so, it can be concluded that the incidence of uncorrected predictions, and thus the prediction accuracy, is relatively low.

Flow proceeds to block 730 where it is determined that a delay should be applied in the next time window.

On the other hand, if the counter is not higher than the threshold, it can be concluded that prediction accuracy is relatively high. Flow proceeds to block 735 where it is determined that the delay should not be applied in the next time window.

Either way, flow then proceeds to block 740, where the counter is reset and the next time window begins. Flow then returns to block 705.

Apparatuses and methods are thus provided for reducing the processing resources and power wasted on fetching instructions that have been incorrectly predicted.

From the above description it will be seen that the techniques described herein provides a number of significant benefits. In particular, processing resources and latency can be traded off such that saving resources is prioritised in times of low prediction accuracy, and saving latency is prioritised in times of high prediction accuracy. This effectively allows overall fetch performance to be optimised.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
prediction circuitry to predict instructions for execution, wherein said prediction circuitry comprises:
a plurality of hierarchical prediction units, comprising a lowest level prediction unit and one or more higher level prediction units to:
perform respective hierarchical predictions of each of the instructions for execution, wherein predictions higher in the hierarchy have a higher expected accuracy than predictions lower in the hierarchy; and
responsive to a given prediction higher in the hierarchy being different from a corresponding prediction lower in the hierarchy, correct the corresponding prediction lower in the hierarchy, and
a prediction correction metric determination unit to determine a prediction correction metric indicative of an incidence of uncorrected predictions performed by the prediction circuitry, the uncorrected predictions being predictions matching predictions of the one or more higher level prediction units, and
fetch circuitry to fetch instructions for execution, the fetch circuitry being configured to:
fetch instructions predicted by at least one of said plurality of hierarchical predictions; and
in response to the prediction correction metric indicating an incidence of said uncorrected predictions being below a threshold, applying a delay before said fetching.

2. An apparatus according to claim 1, wherein the prediction correction metric determination unit is configured to determine the prediction correction metric based on a number, within a time window, of said corrections, by said one or more higher level prediction units, of predictions lower in the hierarchy.

3. An apparatus according to claim 2, wherein the prediction correction metric determination unit is configured to determine the prediction correction metric such that a higher number of said corrections corresponds to a lower prediction correction metric.

4. An apparatus according to claim 2, wherein:
the prediction correction metric determination unit is configured to, in the calculation of the number of said corrections, apply a weighting to said corrections; and
the weighting applied to a given correction is based on the level of the corresponding higher level prediction unit, such that a higher level prediction unit has a higher weight.

5. An apparatus according to claim 2, wherein:
the prediction correction metric determination unit is configured to determine said prediction correction metric at the expiry of each of a plurality of prediction windows; and
the fetch circuitry is configured to apply said delay based on the determined incidence of uncorrected predictions of a previous one of said plurality of windows.

6. An apparatus according to claim 5, wherein said previous one is a most recently expired window.

7. An apparatus according to claim 1, wherein each of the one or more higher level prediction units is responsive to a given prediction matching a corresponding prediction lower in the hierarchy to confirm said corresponding prediction lower in the hierarchy.

8. An apparatus according to claim 1, wherein:
the prediction circuitry and fetch circuitry are configured to operate based on processing cycles; and the fetch circuitry is configured to set the delay to an integer number of processing cycles.

9. An apparatus according to claim 1, wherein the fetch circuitry is configured to:
set the delay to a first amount based on the prediction correction metric indicating an incidence of uncorrected predictions below a first threshold; and
set the delay to a second amount based on the prediction correction metric indicating an incidence of uncorrected predictions below a second threshold.

10. An apparatus according to claim 9, wherein:
the second threshold indicates a lower incidence of uncorrected predictions than the first threshold; and
the second amount is larger than the first amount.

11. An apparatus according to claim 10, wherein:
the first amount is a single processing cycle; and
the second amount is two processing cycles.

12. An apparatus according to claim 1, wherein each higher level prediction unit is configured to perform said correcting in respect of predictions specifically one level lower in the hierarchy.

13. An apparatus according to claim 1, wherein the fetch circuitry is responsive to a given correction, performed by a higher level prediction unit having a hierarchy level equal to or greater than a level threshold, to bypass applying said delay when fetching an associated instruction.

14. An apparatus according to claim 13, wherein the level threshold is the highest hierarchy level.

15. An apparatus according to claim 1, wherein:
the lowest level prediction unit is configured to output a given lowest level prediction in a first processing cycle; and
each of the one or more higher level prediction units is configured to output respective predictions, corresponding to the given lowest level prediction, in respective processing cycles immediately subsequent to said first processing cycle corresponding to their respective hierarchy levels.

16. An apparatus according to claim 15, wherein the fetch circuitry is configured to, by default, begin fetching a given instruction, corresponding to said first prediction, in said first processing cycle.

17. An apparatus according to claim 1, wherein, responsive to a given higher level prediction being different from a corresponding lower level prediction:
the prediction circuitry is configured to flush one or more predictions subsequent to the corresponding first prediction;
the fetch circuitry is configured to flush any fetched instructions corresponding to flushed predictions.

18. An apparatus according to claim 1, wherein the fetch circuitry is responsive to receiving a flush command to:
flush pending predictions and/or pending instructions; and
bypass applying said delay until a post-flush time window has elapsed.

19. A method comprising:
predicting instructions for execution using prediction circuitry comprising a plurality of hierarchical prediction units, comprising a lowest level prediction unit and one or more higher level prediction units to, wherein said predicting comprises:
performing respective hierarchical predictions of each of the instructions for execution, wherein predictions higher in the hierarchy have a higher expected accuracy than predictions lower in the hierarchy; and
responsive to a given prediction higher in the hierarchy being different from a corresponding prediction lower in the hierarchy, correcting the corresponding prediction lower in the hierarchy,
determining a prediction correction metric indicative of an incidence of uncorrected predictions performed by the prediction circuitry, the uncorrected predictions being predictions matching predictions of the one or more higher level prediction units; and
fetching instructions for execution, the fetching comprising:
fetching instructions predicted by at least one of said plurality of hierarchical predictions; and
in response to the prediction correction metric indicating an incidence of uncorrected predictions being below a threshold, applying a delay before said fetching.

* * * * *